E. GOUGH & E. H. MILLER.
WIRE ROPE MACHINE.
APPLICATION FILED JUNE 28, 1911.
1,024,196.
Patented Apr. 23, 1912.
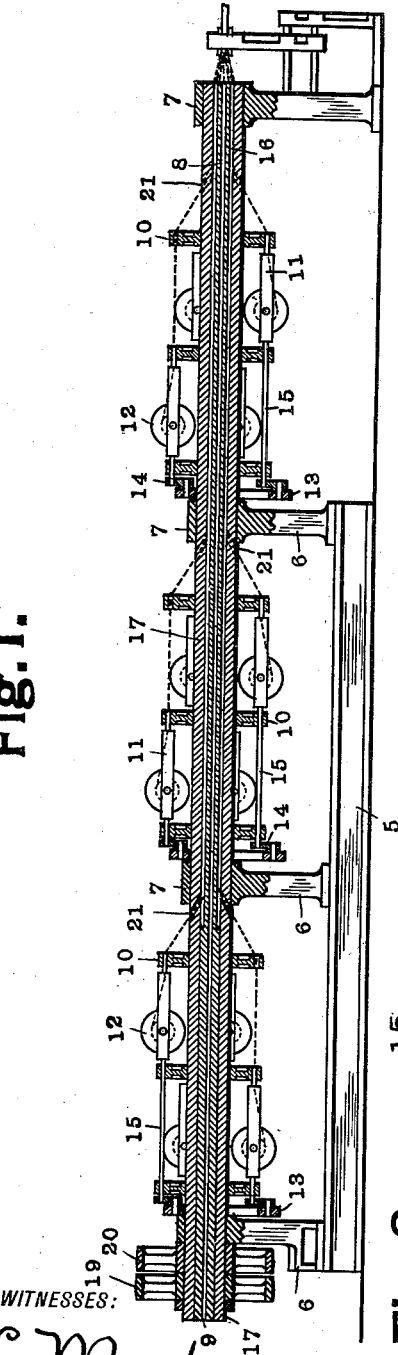
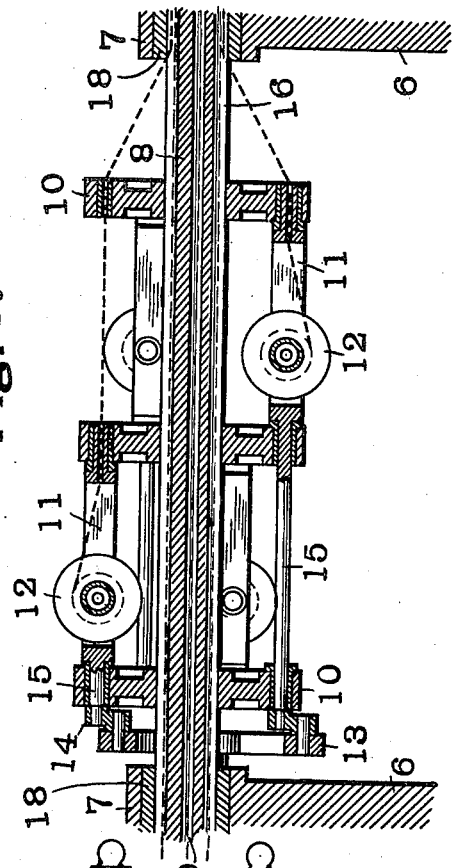
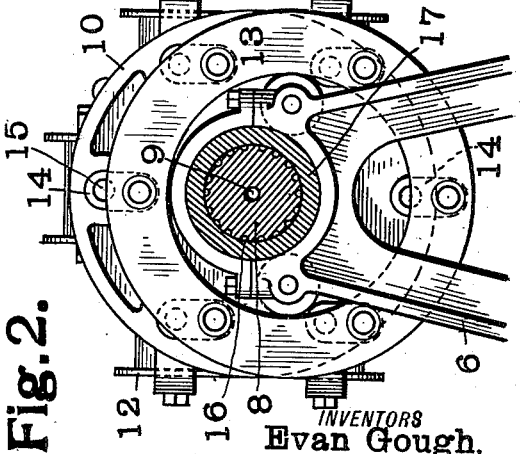
WITNESSES:
L. L. Mead,
W. A. Alexander,
INVENTORS
Evan Gough,
Emil H. Miller.
ATTORNEY

UNITED STATES PATENT OFFICE.

EVAN GOUGH AND EMIL H. MILLER, OF ST. LOUIS, MISSOURI.

WIRE-ROPE MACHINE.

1,024,196.   Specification of Letters Patent.   Patented Apr. 23, 1912.

Application filed June 28, 1911. Serial No. 635,808.

*To all whom it may concern:*

Be it known that we, EVAN GOUGH and EMIL H. MILLER, both citizens of the United States, residing at the city of St. Louis, Missouri, have invented a certain new and useful Wire-Rope Machine, of which the following is such a full, clear, and exact description as will enable any one skilled in the art to which it appertains to make and use the same, reference being had to the accompanying drawings, forming part of this specification.

Our invention relates to a wire rope machine and has for one of its objects the production of a machine in which the fliers or spool holders may be located as close as possible to the main shaft of the machine thus reducing the centrifugal force when the machine is operated at high speeds.

Another object of our invention is to provide means for protecting the wires extending from the spool holders or fliers to the forward part of the machine so that in case of the breakage of such wires they will not become entangled with the mechanism of the spool holders.

Our invention consists in certain novel features and details of construction all of which are described in the following specification and pointed out in the claims annexed hereto.

In the accompanying drawings which illustrate two forms of machine made in accordance with our invention, Figure 1 is a longitudinal vertical section; Fig. 2 is a cross section on an enlarged scale, and Fig. 3 is a view on an enlarged scale showing a vertical section of a modified form of our machine.

Like marks of reference refer to similar parts in the several views in the drawings.

5 represents the base of the machine carrying uprights 6 provided at their upward ends with bearings 7 in which is journaled a shaft 8. This shaft 8 is provided with an opening 9 for the passage of the king wire of the rope to be formed. Surrounding the shaft 8 are a number of spool holders each comprising three disks 10 carrying yokes 11 in which are mounted the spools 12. In order to maintain the parallelism of each of the spools 12 during the rotation of the machine some form of gearing is necessary, such for instance, as the eccentric ring 13 connected by means of crank arms 14 with the shafts 15 by which the yokes 11 are carried. In order to provide passages for the wire we form in the shaft 8 a number of grooves 16. These grooves 16 extend from points adjacent to the forward end of each of the spool holders to the front end of the machine and are adapted to receive the wires from the spools 12. While these grooves 16 may be left open as shown in Fig. 3 of the drawings we prefer to surround the shaft its entire length by means of a sleeve 17 which thus incloses the wires contained in the groove 16. The wires from the spools 12 enter the grooves 16 through inclined radial passages 21. It is upon the sleeve 17 that the disks 10 are directly mounted in our preferred form of machine shown in Fig. 1. In case, however, the sleeve 17 is omitted these disks 10 may be mounted directly upon the shaft 8 as shown in Fig. 3. In this latter construction it is necessary to surround the shaft 8 within the bearings 7 by short sleeves 18 so as to prevent the fluted or grooved shaft from coming in contact with the bearing 7.

19 and 20 represent tight and loose pulleys for driving the machine.

The operation of our device will be readily understood from the above description. The central or king wire of the rope to be formed is passed through the opening 9 in the center of the shaft 8 while the various strands of wire forming the remainder of the rope pass from the spool holders 10 through the passages 21 into the grooves 16 and are wound about the king wire in the manner usual in machines of this class. It will be evident that by our construction the spool holders are brought as close as possible to the main shaft of the machine and at the same time the strands of wire passing from the spool holder to the forward end of the machine are thoroughly protected so that in case of breakage they will not become entangled with the mechanism of the machine.

Having fully described our invention, what we claim as new and desire to secure by Letters Patent of the United States is:

1. In a wire rope machine, the combination with a hollow shaft adapted to receive a king wire, of a spool holding device for said shaft, said shaft having grooves formed in its periphery to receive the wires from said spool holders, and a sleeve surrounding said shaft and inclosing the wires in said grooves.

2. In a wire rope machine, the combination with a shaft, of a plurality of wire carrying means arranged in succession along said shaft, said shaft having a plurality of passages for the reception of the wires, said passages extending from points adjacent to each set of wire carrying means to the delivery end of the machine.

3. In a wire rope machine, the combination with a shaft, of a plurality of wire carrying means arranged in succession along said shaft, said shaft having formed in its periphery a plurality of continuous grooves for the reception of the wires, said grooves extending from points adjacent to each set of wire carrying means to the delivery end of the machine.

4. In a wire rope machine, the combination with a shaft, of a plurality of wire carrying means arranged in succession along said shaft, said shaft having formed in its periphery a plurality of grooves for the reception of the wires extending from points adjacent to each set of wire carrying means to the delivery end of the machine, and a sleeve surrounding said shaft and inclosing the wires in said grooves.

5. In a wire rope machine, the combination with a hollow shaft adapted to receive a king wire, a plurality of spool holders arranged in succession along said shaft, said shaft having grooves formed in its periphery extending from points adjacent to each set of spool holders to the delivery end of the machine, and a sleeve surrounding said shaft and inclosing the wires in said grooves.

6. In a wire rope machine, the combination with a hollow shaft adapted to receive a king wire, of a plurality of spool holders arranged in succession along said shaft, said shaft having formed in its periphery a plurality of grooves extending from points adjacent to the front end of each set of spool holders to the delivery end of the machine, and a sleeve surrounding said shaft and inclosing the wires in said grooves, said sleeve being provided with apertures for the passage of the wire from the spool holders to said grooves.

In testimony whereof, we have hereunto set our hands and affixed our seals in the presence of the two subscribing witnesses.

EVAN GOUGH. [L. S.]
  EMIL H. MILLER. [L. S.]

Witnesses:
 E. E. HUFFMAN,
 W. A. ALEXANDER.

---

Copies of this patent may be obtained for five cents each, by addressing the "Commissioner of Patents, Washington, D. C."